(12) United States Patent
Meyer et al.

(10) Patent No.: US 9,005,501 B2
(45) Date of Patent: Apr. 14, 2015

(54) METHOD AND APPARATUS FOR PRODUCING A FILM WEB FROM THERMOPLASTIC MATERIAL AND FILM PRODUCED THEREBY

(75) Inventors: Helmut Meyer, Troisdorf (DE); Jochen Hennes, Eschborn (DE)

(73) Assignee: Reifenhaeuser GmbH & Co. KG Maschinenfabrik, Troisdorf (DE)

( * ) Notice: Subject to any disclaimer, the term of this patent is extended or adjusted under 35 U.S.C. 154(b) by 198 days.

(21) Appl. No.: 13/585,122

(22) Filed: Aug. 14, 2012

(65) Prior Publication Data
US 2013/0046069 A1 Feb. 21, 2013

(30) Foreign Application Priority Data
Aug. 17, 2011 (EP) .................................... 11177871

(51) Int. Cl.
*B29C 55/00* (2006.01)
*B29C 55/08* (2006.01)
*B29C 47/00* (2006.01)
*B29C 47/88* (2006.01)

(52) U.S. Cl.
CPC .............. *B29C 55/08* (2013.01); *B29C 47/0021* (2013.01); *B29C 47/0057* (2013.01); *B29C 47/8845* (2013.01); *B29C 55/00* (2013.01)

(58) Field of Classification Search
CPC .................................................... B29C 55/143
USPC ......................................... 425/66; 264/210.7
See application file for complete search history.

(56) References Cited

U.S. PATENT DOCUMENTS

| 3,471,606 A | 10/1969 | Corbett et al. |
| 4,803,027 A * | 2/1989 | Peiffer et al. ............... 264/210.5 |
| 5,709,932 A | 1/1998 | Glez et al. |
| 5,833,904 A * | 11/1998 | Muskalla et al. ......... 264/178 R |
| 2007/0267774 A1 | 11/2007 | Ueda |

FOREIGN PATENT DOCUMENTS

| DE | 22 45 306 | 3/1974 |
| DE | 23 61 368 | 6/1975 |
| EP | 0 319 401 | 6/1989 |
| EP | 1 900 498 | 3/2008 |
| WO | WO 2006/126717 | 11/2006 |
| WO | WO 2007/034029 | 3/2007 |
| WO | WO 2007/110484 | 10/2007 |
| WO | WO 2010046738 A1 * | 4/2010 |

OTHER PUBLICATIONS

European Search Report in EP 11 17 7871.8 dated Jan. 18, 2012.
European Examination Report EP 11 17 7871.8 dated Feb. 2, 2012 with English translation of relevant parts.
Examination Report of the parallel European Patent 12005898.7 dated Oct. 25, 2012, with English translation of relevant parts.

* cited by examiner

*Primary Examiner* — Alison Hindenlang
(74) *Attorney, Agent, or Firm* — Collard & Roe, P.C.

(57) ABSTRACT

The invention relates to a method and an apparatus for producing a film web made of thermoplastic material in which the thermoplastic material is extruded in at least one layer as plastic melt from a wide-slit nozzle in an extrusion direction and subsequently led away over at least roller, wherein tensile forces are exerted in the extrusion direction and transversely to the extrusion direction in order to stretch the film web longitudinally and transversely, wherein during application of the tensile forces in and transversely to the extrusion direction the film web has a temperature at least corresponding to the melting temperature of the same.

16 Claims, 4 Drawing Sheets

METHOD AND APPARATUS FOR PRODUCING A FILM WEB FROM THERMOPLASTIC MATERIAL AND FILM PRODUCED THEREBY

CROSS REFERENCE TO RELATED APPLICATIONS

Applicant claims priority under 35 U.S.C. §119 of European Application No. 11 177 871.8 filed on Aug. 17, 2011, the disclosure of which is incorporated by reference.

The invention relates to a method for producing a film web made of thermoplastic material. In particular the invention relates to such a method in which the thermoplastic material is extruded in at least one layer as plastic melt from a wide-slit nozzle in an extrusion direction and subsequently led away over at least one roller, wherein tensile forces are exerted in the extrusion direction and transversely to the extrusion direction in order to stretch the film web longitudinally and transversely.

The invention further relates to an apparatus for producing such a film web.

In addition, the invention relates to a film web produced thereby.

When producing film webs from thermoplastic material by means of extrusion of a melt, a distinction is substantially made between two different methods, namely on the one hand the production of flat film from wide-slit nozzles, on the other hand the manufacture of blow film from round-slit nozzles.

During the production of flat film using a wide-slit nozzle, the melt emerging from the wide-slit nozzle is drawn out to a specific thickness and cooled. Transparency, gloss and some mechanical properties of the film are strongly influenced. Typically the film web obtained acquires an orientation of the polymer chains in the extrusion direction, which leads to anisotropic properties of the film web. Corresponding methods are known, for example, from EP 0 319 401 B1, from U.S. Pat. No. 5,709,932 or EP 1 900 498 A1.

US 2007/0267774 A1 discloses a system for extruding a film web from a wide-slit nozzle. The extruded melt is applied to a cooling roller, runs around this and crystallises during contact with the surface of the cooling roller. It is removed from the cooling roller in the form of a solid film and then runs firstly through a longitudinal stretching zone, then a transverse stretching zone until it is finally wound.

In contrast to this, during the blow film process, that is extrusion of a plastic melt emerging from an annular tool and subsequently formed into a tube, the melt is drawn longitudinally and transversely during the so-called tube formation zone. This takes place above the melting range of the extruded polymer, that is in melt form. The film is drawn more rapidly by a draw-off than it is extruded. As a result, the film is stretched in the longitudinal direction. The film is additionally stretched in the transverse direction by the blowing. The result is therefore a biaxially stretched film which however, as a result of the less strongly forced cooling, for example, has disadvantages in the optical properties compared with the flat film.

Just under fifty years ago, U.S. Pat. No. 3,471,606 suggested introducing the film extruded from a wide-slit nozzle initially into an arrangement of two pairs of endless chains. The pairs of endless chains are arranged on film transport apparatus so that they are adjustable in height and angle. In particular, in the extrusion direction, therefore downwards in the example shown, they can be placed in a diverging manner so that the freshly extruded film is gripped laterally on running through the endless chain pair and thereby stretched transversely. An optional cooling roller can then be provided with which a longitudinal stretching can be executed. Normally U.S. Pat. No. 3,471,606 guides the film web in the form of a melt through the pair of endless chains so that the transverse stretching can be carried out with the film web in melt form, that is at a temperature above the melting range.

It is the object of the present invention to improve the prior art or provide an alternative to this.

According to a first aspect of the invention, the formulated object is solved by a method for producing a film web made of thermoplastic material in which the plastic is extruded in a layer from a wide-slit nozzle in an extrusion direction and subsequently led away over a roller, wherein tensile forces in the extrusion direction and transversely to the extrusion direction are exerted on the film web in order to stretch the film web longitudinally and transversely and wherein the layer can alternately acquire the form of a film or the form of a melt, where the film form is established during a cooling of the layer below a melting range or wherein the melt form is established during a heating of the layer above a melting range, where the film web (a) is initially extruded in melt form at an extrusion speed and (b) is then guided directly afterwards in melt form to a cooling roller arrangement, wherein the film web is guided around a cooling or smoothing roller at a circumferential speed higher than the extrusion speed so that the film web is subjected to a longitudinal stretching, (c) is subsequently guided out from the cooling roller arrangement and (d) is then subjected to a transverse stretching, wherein both stretching steps are carried out on the layer in the melt form so that the stretching takes place on both occasions in the form of a drawing of the melt.

Conceptually the following should be explained on this matter:

"Thermoplastic materials" are generally known. In the practice of film web production, the most commonly used are polymer composites with or made of polypropylene (PP), polyethylene (PE, HDPE, LDPE), polyacrylic (PA), polystyrene (PS), or polyvinyl chloride (PVC).

Within the framework of the present invention here it is possible to talk generally of a polymer composite.

The extrusion of the film web should take place "in at least one layer". The extrusion of a single-layer film is probably the simplest case in practice. However, a plurality of layers can also be extruded simultaneously. In this case, the present invention is even present when not necessarily the entire polymer composite is stretched longitudinal and transversely with each of its layers in melt form but even when this condition is only satisfied for one layer.

Preferably, however, the film web is stretched longitudinally or transversely whilst a plurality of or even all the layers of a multilayer film web are present in melt form.

In the sense of the present application here, a longitudinal stretching of the film web is understood as a stretching in the extrusion direction, i.e. a stretching in that direction in which the film web emerges from the wide-slit nozzle and subsequently is transported further through the system parts whereas transverse stretching is understood as a stretching twisted through 90° with respect to the extrusion direction.

In general it should be noted that within the framework of this patent application indefinite and articles and indefinite numerical words should be understood as "at least" information. Therefore whenever there is talk of "one", "two" etc, this should be understood as an 'at least' information if it does not follow from the particular context that "precisely one", "precisely two" etc. should be meant there.

The word "stretching" should be understood within the framework of this application as an umbrella term. If the stretching takes place on a crystallised film web, that is on a film web in the film form, it would be necessary to talk of "drawing out" under the umbrella term. If on the other hand, the stretching takes place on the film web in melt form, preferably on the highly viscous melt, that is at a temperature above the melting range and below a transition into the gaseous state, then it would be necessary to talk of a "drawing".

The "melting range" is intended to express in simple words that temperature range or that temperature below which the extruded layer is no longer present as a melt but rather as a solidified film. In flat film production this change of properties usually takes place on a cooling roller of a cooling roller arrangement directly after the wide-slit nozzle, where cooling roller arrangement either comprises a single cooling roller or a smoothing mechanism.

If the temperature of the plastic lies above the melting range, the plastic then acquires the melt form. If on the other hand the temperature lies below the melting range, the plastic then acquires the film form. A neutral range lies in between.

The melt form and the film form can be distinguished by observing the restoration to the original state after a rapid, short deformation: in a melt the restoration when deformation is relaxed is significantly smaller than in the case of a film. A melt flows whereas a film can barely flow.

In the Maxwell spring-damper model, the melt has almost no spring but only a weak damper.

In some thermoplastic materials crystallisation can be observed. Here a partial ordering of the molecular chains in the polymer comes about during solidification of the melt. Starting from crystallisation nuclei, the molecular chains cluster and form so-called lamellae.

Crystallite formation is dependent on the cooling conditions, the additives and the fillers in the polymer and on the flow conditions during solidification. A subsequent stretching changes the arrangement of the molecules and therefore the properties of the material.

As previously many phenomena relating to the crystallisation of polymeric materials are not finally understood or even demonstrated. Various models have been supported by experimental findings and have been accepted.

All polymers are constructed of very long molecular chains. Thermoplastic polymers are characterised in that they melt with increasing temperature. In the melt the molecular chains are arranged irregularly in the form of knots which pass through one another many times. In many thermoplastic polymers this disorder is preserved during the cooling as an amorphous structure in the solidified solid. If, on the other hand, the melt of a partially crystalline polymer cools, the chains move increasingly less and begin to arrange themselves regularly. This results in the formation of ordered states which is designated as crystallisation.

During the crystallisation of polymers, sections of the molecular chains settle parallel to one another. Energetically the most favourable would be if the molecules were arranged parallel over the entire length of the molecular chain. However, since the molecular chains in the melt are present as intertwined knots, in reality this order cannot be achieved or can only be achieved at very high pressure. In practice, therefore crystallites of folded molecular chains are formed, which form the basic structures of larger structural units, for example, lamella structures. The order is not to be seen as complete. Each crystallite therefore consists of ordered (crystalline) and disordered (amorphous) subregions.

In general, thermoplastic materials differ from low-molecular solid substances in their behaviour during heating. All pure, defined organic substances having small or low molar mass have a fixed melting point. At a specific temperature which can be determined precisely to tenths of a degree, the substances go over from the solid to the liquid state.

Thermoplastics on the other hand comprise individual polymer chains of different length and different branchings. The polymers therefore have no sharp melting point but a so-called "melting range". They become soft and plastic at higher temperatures. The viscous melts can be deformed and are transferred back into the solid state during cooling.

Reference points for the processing temperatures are therefore the melting ranges of the polymers. For polyethylene, for example, these lie at 110° C. to 135° C., for polypropylene around 165° C., for polyethylene terephthalate and polycarbonate around 260° C. Polyvinyl chloride melts at about 160° C. with incipient decomposition.

Quantitative statements about the crystalline regions of a thermoplastic are possible by determining the crystallite melting point. For the amorphous fractions the glass transition temperature is the corresponding quantity. Glass transition is understood as the reversible change of a high-polymer material from a brittle, hard, glassy state to a flexible, soft elastic behaviour. The transition takes place during heating in a narrow temperature range, i.e. the glass transition temperature. The designation "freezing temperature" is to be understood synonymously and describes the same process during cooling of a polymer. The glass transition is of particular importance for the mechanical properties of plastics. Since most polymers used for manufacturing films have both amorphous and crystalline regions, glass transition temperature and crystallite melting point are important quantities for the processing and application of films.

The melting range of a polymer sometimes cannot be determined accurately in the shear modulus curve. In the so-called DSC curve, i.e. plotting the endothermic heat flow or the exothermic heat flow over temperature, on the other hand, the melting range can be identified well by a defined maximum.

For the example of polypropylene it can be assumed that the defined maximum is established during heating of the polymer at around 160° C. to 170° C. This range is also designated as crystallite melting range.

During cooling of the polypropylene, an exothermic maximum is seen at around 115° C.

In an extended view within the framework of the present patent application, the "melting range" is interpreted as the temperature range between the crystallite melting range and the recrystallisation temperature. In a narrower view, only the crystallite melting range or the recrystallisation temperature are to be interpreted as the melting range. If the extruded melt is held above the crystallite melting temperature during both stretching processes, the biaxial stretching can certainly take place in melt form.

Going below the crystallite melting temperature is also feasible without losing the advantageously processable properties of the melt as long as the melt is still above the recrystallisation temperature.

The "film web" can be present in film form or in melt form. "Film web" is to be understood here as an umbrella term for "melt" and "film".

The fact that the film web is guide out "later" from the cooling roller arrangement and "thereafter" subjected to a transverse stretching should be understood in each case as an "arbitrarily later" or as an "arbitrarily thereafter". It can therefore, but need not, follow "immediately", i.e. "directly".

The invention advantageously achieves with its first aspect the fact that a process with controllable optical and mechanical properties can be carried out for the film web: Since both stretching steps are carried out whilst the layer of the film web is in melt form, biaxially stretched films can be produced without major installation expenditure and effort.

The film web is held in melt form between the extrusion step and the longitudinal stretching in the cooling roller arrangement. On emerging from the wide-slit nozzle, the film web is hot in any case and necessarily in melt form. It is therefore proposed to preserve this first heat and perform the longitudinal stretching in the cooling roller arrangement immediately. Then neither heating measures nor excessive temperature preserving measures need be carried out.

The invention would like the melt to be initially subjected to a longitudinal stretching and only then to a transverse stretching. Both stretching steps should be carried out according to the invention whilst the layer of the film web is still present as melt although it is known specifically that rapid, severe cooling of the melt on the cooling roller of the cooling roller arrangement provides for excellent optical properties of a film web produced in the flat film extrusion process.

Whereas U.S. Pat. No. 3,471,606 is relatively severely restricted with transverse stretching initially carried out, the present invention has shown that it is significantly an advantage if the longitudinal stretching is carried out initially. Thus it is possible in particular to carry out the longitudinal stretching immediately after the wide-slit nozzle by means of a roller where this can preferably be a cooling roller. With such a structure the system up to that point does not differ substantially from a conventional flat film extrusion system. It can therefore be adjusted according to the desired film result whether the process should rather be carried out with a rapid cooling or rather with a slow cooling or only little cooling before the transverse stretching.

In one possible embodiment, the film web is held on the cooling roller and held at a temperature above the melting range up to the transverse stretching.

In a preferred embodiment, the film web is cooled on the cooling roller as far as the film form and is released from the cooling roller more easily than in the melt form.

It should be noted that the present invention can be carried out both with a simple cooling roller and also with a smoothing mechanism where in the case of a smoothing mechanism, it can be irrelevant whether extrusion is carried out onto the cooling roller or onto the counter-roller. Within the framework of the present application in some cases for the sake of better legibility, there is simply only talk of the cooling roller. It should then be understood in each as the "simple cooling roller or smoothing mechanism roller" provided that nothing to the contrary follows from the context.

A releasing apparatus is preferably used to release the film web from the cooling roller, in particular with a compressed air or suction means. The more strongly the release of the film web from the cooling roller is assisted, the warmer the film web can be allowed to run from the cooling roller. Then less heating energy is required to bring the film web into the melt form for transverse stretching or hold it there.

The at least one layer of the film web during the two stretching steps can have a temperature higher than its melting temperature so that the stretching steps comprise a drawing, that is a stretching of the layer in melt form or ideally of the entire film web in melt form. High forces are not required for this so that the system overall can be constructed very cost-effectively and compactly.

It has already been mentioned that the layer of the film web during the two stretching steps can have a higher temperature than its recrystallisation temperature. This will usually be lower than the crystallite melting temperature. In the window between these two temperatures, however, the layer will be present as a melt as long as the recrystallisation temperature was not reached previously without the crystallite melting temperature being reached again in the meantime.

It is in particular feasible to use the cooling roller for cooling the melt to a temperature which is significantly lower than the extrusion temperature but nevertheless lies above or in the melting range. Also it is readily possible to adjust by means of the temperature of the cooling roller how far the film web should be cooled after the extrusion step or how far the film should be left rather hot. The resulting temperature of the film web after the cooling roller is in particular influenced by the roller temperature, the contact area and the contact time.

The temperature of the cooling roller during the ongoing process influences the crystallite size and therefore the properties of the film in a particularly easily controllable manner. In present-day systems the cooling roller temperature can easily be kept constant within 2 K by suitable technical measures. Usually in practice a cooling fluid is pumped through the cooling roller to regulate the temperature at the cooling roller. The temperature is usually measured in the return of the cooling fluid from the roller. Acceptance of a difference from the temperature at the surface of the roller and from the temperature of the film is assumed to mean that the return temperature in each case approximately corresponds to the surface temperature of the roller.

Naturally it would also be possible to measure the temperature of the film and/or of the roller surface, for example, by means of a non-contact infrared measurement.

In order that the melt film emerging from the nozzle rests as closely as possible on the surface of the cooling roller, it is proposed that an air knife, a vacuum box and/or an air brush should be used. These operate with the aid of an air flow. As a result the intake of air between cooling roller and film is avoided because the intake of air can result in a delayed cooling and therefore turbidity of the film or in a deterioration of the other properties.

Between the cooling roller arrangement and the transverse stretching the film web can be guided through a heating station. A "heating station" in the sense of the present application should be understood as a station which is adapted with an active heating means to hold or increase the temperature of the film web running past. The machine frame which simply heats up during operation should not be included here. Rather an active heating means should only be understood as such if it can be operated independently for heating, in particular therefore has a flow and return for a heating fluid, such as for example water or oil and/or a power connection. In a simple case, this can, for example, be a heating roller, preferably heated in its interior by means of fluid or by means of electricity or heated for example from outside or inside via a laser beam or it can for example comprise a heat radiator or a heating furnace through which the film web runs. During a heating of the film web between the first stretching step at the cooling roller arrangement and the second stretching step in the transverse direction, it is easier to also execute the second stretching step with the film web in melt form, particularly as thermal energy had previously already been withdrawn from the cooling roller of the film web.

The temperature of the film web can be regulated during the transverse stretching step which can lead to more reliable film results.

According to the present assessment of the invention, however, with a suitable arrangement of the system it is not necessary to regulate the temperature of the film web during the transverse stretching step or to drive the film web through a heating station.

In a constructive embodiment of the inventive aspect, the film web can be subjected to transverse stretching between two rotating and adjustable disks. A wide stretching station with such disks can be constructed very compactly and nevertheless offer a high degree of adjustability for the process.

In particular it is feasible that the transverse stretching of the film web to be accomplished after the longitudinal stretching effected at the beginning of the cooling roller arrangement is forced by means of two rotating disks assigned to the film web, via which the film web is guided at least at the melting temperature, where the film web at most envelops about half the circumference of the disks between a run-in position and a run-out position and the disks are inclined with respect to the imaginary connecting line between run-in position and run-out position at an angle α with respect to the vertical. Particularly if the film web is present completely in melt form, only low tensile forces need to be applied transversely to the extrusion direction for the desired transverse stretching, which can readily be accomplished with little effort by the disks running at an inclination to the vertical.

The angle of the disks is preferably adjustable in order to be able to set different stretching ratios transversely to the extrusion direction and to facilitate the starting up of an apparatus configured in such a manner.

Alternatively or cumulatively to the constructive embodiment with two rotating disks, it is proposed that the film web is subjected to the transverse stretching step by means of two diverging bands.

In particular it is feasible that after the longitudinal stretching, the film web is clamped at the edge between endlessly circulating pairs of bands and when viewed in the extrusion direction, the pairs of bands have an increasing distance from one another so that the film web is clamped at the edges in the pairs of bands as it runs through and is stretched transversely to the extrusion direction as a result of the gradually increasing distance of these bands.

The person skilled in the art will identify that as a result of the only low forces required according to the invention, a plurality of further solutions are available for carrying out the transverse movements required for the transverse stretching.

It can be provided to hold the film web laterally by means of a tight fit during the transverse stretching, in particular to clamp it positively at the edges in order to improve the introduction of the tensile forces transversely to the extrusion direction.

After the transverse stretching, the layer of the film web can be cooled into the film form or however still be present in melt form. In the latter case, it is then provided to cool the film web until it is in film form, for which, for example, it is possible to guide it over at least one cooling roller and/or expose it to a cooling air flow.

It can be provided that the film web in the film form of the layer is subjected to a longitudinal drawing out and/or tempering between the cooling roller arrangement and the transverse stretching.

The longitudinal drawing out can be accomplished with a longitudinal drawing-out device (designated as "MDO") in which the film web is usually lengthened between a holding and a drawing-out roller by more than 5% of the original length, easily by up to ten times of the original length and further. As a result of the film form, we talk of a "drawing out" of the film web or the layer.

During the tempering the running film web is subjected to a temperature treatment, usually by means of a tempering roller or by means of a tempering section comprising a plurality of tempering rollers. The tempering treatment consists in influencing the temperature in the film web by means of an active heating or cooling means in order to hold, cool only slightly or increase slightly the temperature of the film web.

For example, a tempering roller having a feed, an inner guidance and a drain for a fluid can be connected to a fluid circuit in which the fluid, primarily water or oil is actively heated, cooled and/or its temperature can be measured. In a simple example, the return temperature of the fluid is measured in the fluid circuit and from this the temperature of the roller is determined allowing for a small error. The tempering can be adjusted so that the running film web for example experiences a temperature variation of +/−50 K, +/−30 K, +/−10 K or less, relative to the difference between the temperatures of the film web on the one hand in the flow to the tempering roller, on the other hand in the drain from the tempering roller.

It is understood that within the framework of the present application, technical average temperatures are being talked about. The temperature of the plastic can easily fluctuate by 2 K or more within the film web both in the melt form and in the film form.

According to a second aspect of the present invention, the formulated object is solved by an apparatus for producing a film web from thermoplastic material comprising an extruder communicating with a wide-slit nozzle and a roller downstream of the wide-slit nozzle, via which the film web emerging from the wide-slit nozzle can be removed as a melt having a layer, as well as a cooling roller arrangement directly after the wide-slit nozzle and a transverse stretching station located on the same apparatus in the subsequent flow path, wherein the apparatus is adapted to supply the film web at a temperature above a melting range of the layer in the melt form to the cooling roller arrangement and the transverse stretching station.

It has already been explained previously that the apparatus can then be constructed very compactly and nevertheless very efficiently if both the cooling roller arrangement and also the transverse stretching station can each perform the stretching process with the film web in melt form, that is only a mere pulling of the melt needs to be carried out.

In other words, the apparatus for producing a film web of thermoplastic material can have devices for longitudinal and transverse stretching of the film web, where the film web can be supplied to the devices for longitudinal and transverse stretching at a temperature corresponding at least to the melting range, where feed and/or regulating means are provided and adapted to feed the film web in melt form to both devices.

The device for longitudinal stretching of the film web should be formed by the cooling roller, which is located downstream of the wide-slit nozzle and which is acted upon directly by the film web emerging as melt from the wide-slit nozzle.

A cooling roller known from a classical flat extrusion system is therefore provided which takes on two different functions: on the one hand it can rotate at a surface circumferential speed which is higher than the extrusion speed from the wide-slit nozzle. This leads to a longitudinal stretching of the film web. At the same time, the roller is configured as a cooling roller, that is having a fluid supply for a cooling fluid, with which the roller is held at a temperature below the melting temperature and below the inlet temperature of the film web to the roller.

For example, the cooling roller can be between 10 K and 200 K cooler than the melt running onto it.

In general, it should be pointed out that within the framework of the present application the "regulating" is understood as an umbrella term. Regulating therefore also includes controlling, in particular however a regulating in the technically exact sense, that is with compensation between desired values and actually measured actual values.

It is proposed that the apparatus has a web guidance geometry for a first and for a second web run, in order to select between two operating modes, namely on the one hand the first web run including the transverse stretching station, on the other hand the second web run bypassing the transverse stretching station, whereby bypassing the transverse stretching station should be understood as such an arrangement in which the elements of the transverse stretching station are passed through but these exert no transverse stretching forces on the film web. For example, in the case of rotating disks as transverse stretching station, these can be placed parallel to one another or in the case of endlessly circulating conveyor belts, these can be placed parallel to one another.

Alternatively or cumulatively it is proposed that a control means is predefined in order to influence the ratio of two operating modes of the apparatus to one another. For example, for producing the film web as in a flat film extrusion the cooling roller can be set so cool immediately after the wide-slit nozzle that even before reaching a transverse stretching station, for example, when leaving the cooling roller, the melt form no longer exists but the film is already solidified. Or, in contrast to this, an operating mode is set in which a rapid cooling is avoided and the film web is guided as warm as possible to the transverse stretching where it is only cooled down so far that the film web can be better guided and can be released from the roller. Or ideally, one or several or continuously each operating point can be set between these two extrema.

Constructively it is proposed for the transverse stretching station that the device for transverse stretching of the film web comprises two disks which are spaced apart from one another and assigned to the edges of the film web, over which the film web can be guided between a run-in and a run-out region whilst partially looping around the circumference of the same, wherein the disks are arranged so that they can be rotated about an angle α from the vertical by means of an adjusting device in the region of the imaginary connecting line between the run-out position and the run-in position.

It can further be provided that the circumferential regions of the disk used for guidance of the film web are configured with means for holding the film web. Here, for example, radially projecting needles or a belt looping around the disks between the run-in region and the run-out region are considered.

It has already been mentioned that the device for transverse stretching of the film web alternatively comprises two pairs of endlessly circulating bands which are spaced apart from one another and assigned to the edges of the film web, which each define a band gap in which the film web can be clamped at the edges, where the distance between the pairs of endlessly circulating bands when viewed in the run-through direction of the film web is configured to be increasing.

It is clear to the person skilled in the art that the solutions listed here for carrying out a transverse stretching only serve as examples and there are physically many possibilities to achieve a transverse movement.

In each case it can be provided to accommodate the device for transverse stretching of the film web in a heat-insulating optionally actively heated housing in order to ensure that during the transverse stretching of the film web this or at least one layer of the film web has a temperature which lies above the melting range.

The apparatus can have a station for each of the proposed process steps.

It has already been mentioned that in the sense of the invention the film web need not necessarily consist of only one layer of thermoplastic material but can also be configured to be multilayered where the individual layers can consist of the same and of different polymers.

The invention shows some possibilities for giving the film or layer an additional orientation in the transverse direction in a very simple manner. The solution is relatively simple and therefore also very inexpensive and leads to other properties of the film.

The invention is explained in detail hereinafter by means of two exemplary embodiments with reference to the drawings. In the figures.

Figure 1:
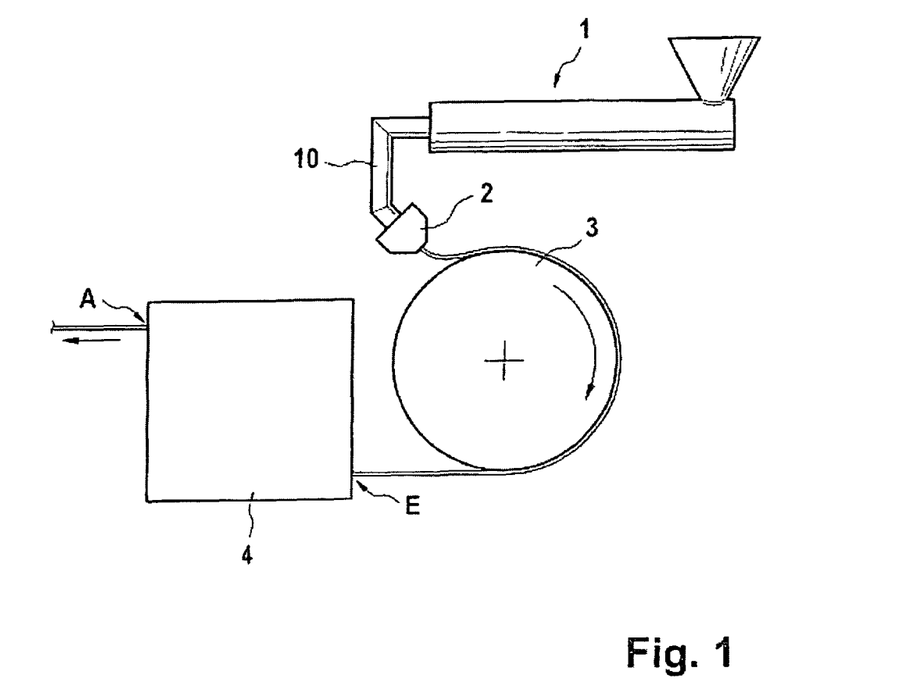
FIG. 1 shows in highly schematic view an apparatus according to the invention.

An apparatus for producing a film web from thermoplastic material by the so-called flat film extrusion method can be seen from FIG. 1 in a schematic highly simplified view. The apparatus comprises an extruder 1, which communicates via melt feed 10 with a wide-slit nozzle 2, from which the stream of a melt of thermoplastic material prepared in the extruder 1 is placed on a cooled casting roller 3 which is operated in the direction of rotation indicated and removes the melt from the wide-slit nozzle to form a film web. It is understood that instead of the apparatus shown here comprising only one extruder 1, a plurality of extruders can also be provided for producing a corresponding multilayer film web of thermoplastic material.

The casting roller 3 is operated in the direction of rotation indicated at a circumferential speed which is adjusted above that speed which would be synchronous to the outlet speed of the film web present as melt from the wide-slit nozzle 2, with the consequence that the film web emerging from the wide-slit nozzle 2 in the so-called extrusion direction experiences tensile forces in the extrusion direction and in this respect is longitudinally stretched. The extent of the applied tensile forces and the longitudinal stretching established as a result is determined by means of the previously described increase in the circumferential speed of the casting roller 3 with respect to the synchronous speed to the outlet speed of the film web from the wide-slit nozzle. Since, in addition the film web at its exit from the wide-slit nozzle 2 has a temperature corresponding at least to the melting temperature of the same due to the process, the previously explained longitudinal stretching takes place at a time at which the film web is still molten so that only small forces need to be applied.

The film web already longitudinally stretched to such an extent on the casting roller 3 is subsequently supplied to a device 4 for transverse stretching of the film web in the manner shown schematically in FIG. 1 and specifically to an inlet of the same designated by E, where after running through the device 4 for transverse stretching, the film web leaves the device 4 at the outlet characterised by A and can be supplied to a further processing, for example, winding and the like.

Figure 2:
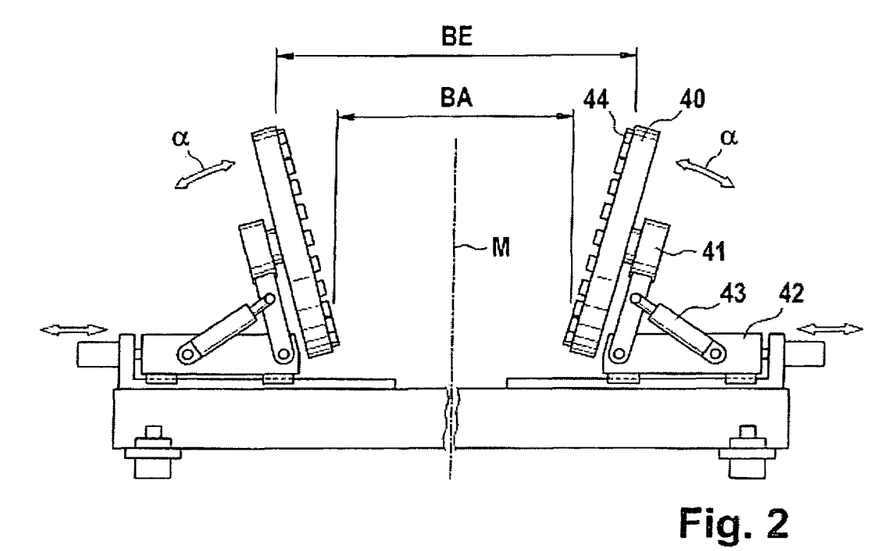
FIG. 2 shows a view of the device for transverse stretching of the film according to FIG. 1.
Figure 3:
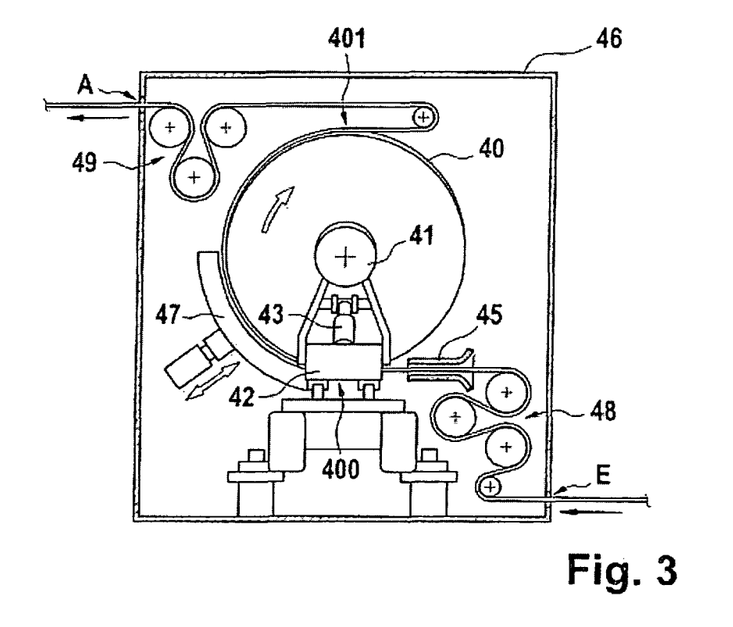
FIG. 3 shows a side view of the apparatus according to FIG. 2.

The precise structure of the device 4 for transverse stretching of the film web can be seen from FIGS. 2 and 3.

The film web enters at the inlet E into a heat-insulating housing 46 surrounding the device 4 and is initially guided over a plurality of heating rollers 48 which are tempered so that the temperature of the film web again at least corresponds to the melting temperature of the same insofar as the film web on entering into the device 4 at the inlet E does not otherwise have a temperature above the melting point of the same.

The film web tempered to such an extent to a temperature above the melting point of the same runs at the edge via a centring 45 onto two disks 40 which can be rotatably driven by means of a drive 41 with corresponding mounting in the indicated orientation. It can be seen that the structure of the device is executed as a mirror image to the central axis M which can be seen in FIG. 2 so that the explanations given here for the device 4 apply as a mirror image both for the right and the left apparatus half in relation to the centre line M.

The disks are adjustable with regard to their position with respect to the central axis M by means of a width adjusting unit 42 in order to adapt to the initial width BA of the film web, i.e. the width in the area of the centring 45.

Furthermore an angle adjusting unit 43 is provided which allows the disks to be mounted inclined at an angle $\alpha$ from the vertical.

As can be seen in particular from FIG. 3, the film web supplied via the centring 45 and having at least the melting temperature runs approximately at 6 o'clock at a run-in position 400 onto the circumference of the disks 40 and on running further through the device loops around about half the circumference of the disks 40 until at a run-out position identified by 401 at about 12 o'clock it is raised from the circumference of the disks again and fed via a plurality of deflecting rollers and tempering rollers 49 to the outlet A from the apparatus 4.

Since the imaginary connecting line between the run-out position 401 and the run-in position 400 of the disks can be rotated by the angle $\alpha$ from the vertical by means of the angle adjusting unit 43, the film web resting on the disk circumference at the edge when running from the run-in position 400 to the run-out position 401, consequently undergoes a stretching transverse to the extrusion direction as a result of which the original width BA changes into the end width BE of the film web due to the action of tensile forces directed transverse to the extrusion direction.

Since the film web during passage through the device 4 remains at a temperature at least corresponding to the melting temperature of the same, the tensile forces required to exert this width increase transverse to the extrusion direction are relatively small and can be introduced by the disks 40 arranged to be inclined to such an extent with respect to the vertical.

For starting up such a device 4, the disks 40 are initially mounted in the vertical alignment by the angle adjusting unit 43, i.e. the angle $\alpha$ tends to zero and the film web undergoes no transverse stretching and width increase. Whilst the film web runs continuously through the device 4, the disks 40 are then moved by means of the angle adjusting unit 43 to the desired angle of inclination $\alpha$ so that the desired transverse stretching and width increase of the film web is gradually established.

Figure 4:
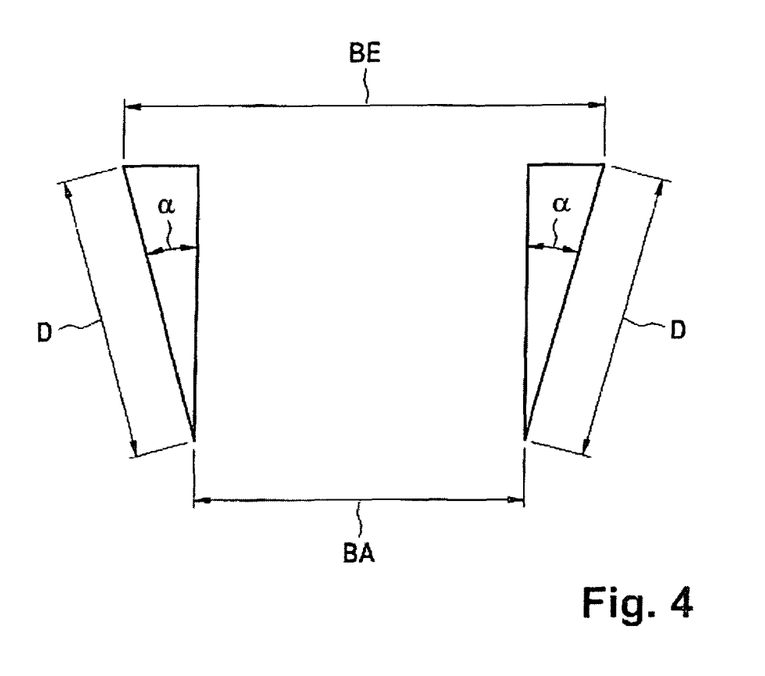
FIG. 4 shows the mode of action of the apparatus according to FIGS. 2 and 3.

As can be seen in particular from the diagram according to FIG. 4, the size or the extent of the transverse stretching is determined by the inclination, i.e. the angle of inclination a of the two disks 40. The stretching ratio "R" can be determined from the diagram according to FIG. 1 from the indicated quantities, where D determines the diameter of the disks 40, $\alpha$ is the angle of inclination of the same, BA is the initial width of the film and BE is the end width or finished width of the film and the following relationship exists between BA and BE:

$$BE = BA + 2 \cdot D \cdot \sin \alpha$$

The stretching ratio R is then obtained as follows:

$$R = \frac{BE}{BA} = 1 + \frac{2 \cdot D \cdot \sin \alpha}{BA}$$

In order to improve the application of the tensile forces to the film for the transverse stretching, the disks can, for example, be fitted with needle holders 44 assigned to the circumferential regions of the same, which each carry needles which penetrate through the film web and thus produce a tight fit between the film web and the disks 40 and introduce the tensile forces almost free from losses into the film web as a result of the inclination of the disks 40 by the angle $\alpha$ from the vertical. The accompanying perforation of the edge zones of the film web is acceptable since in order to achieve uniform edges of the film web, this undergoes edge trimming before winding in any case in which the perforations are separated.

If, in a modification of the previously described embodiment, the film web should initially not be longitudinally stretched on the casting roller 3 but, for example, initially quenched to a temperature below the melting point in order to achieve a high degree of gloss, it seems feasible to operate the disks 4 at a higher circumferential speed compared with the feed speed of the film web at the inlet E within the device 4 shown. In such a case, the film web would initially be heated by the heating roller again to a temperature above the melting temperature and then when running through the device 4 before running onto the disks 40, initially stretched in the extrusion direction, i.e. longitudinally and then stretched transversely to the extrusion direction whilst resting on the disks 40.

It can be further identified in the diagram according to FIG. 3 that at least in a partial looping region of the disks 40, a heating device 47, for example, adjustable infrared heaters, can be provided in order to prevent the temperature of the film web falling to a temperature below the provided drawing-out temperature of the film web during running through the device 4 and in particular during the action of the disks 40.

With the apparatus according to the invention and the method it is therefore possible to produce film web extruded from a wide-slit nozzle by the flat film method at low cost which, similarly to a blown film, undergoes a certain stretching in the melt-liquid state both in the extrusion direction and also transversely thereto in order to thus obtain an additional orientation in the longitudinal and transverse direction in a simple manner. The temperature of the film web during the longitudinal and transverse stretching can be guided largely unregulated as long as it is ensured that at least melting temperature exists, or temperature sensors and corresponding tempering elements such as rollers, radiation heaters and the like are provided in order to obtain a controlled temperature guidance of the film web during the longitudinal and transverse stretching.

In the case of producing a multilayer composite to form the film web, it is provided according to the invention that at least one of the individual layers of the film web has the temperature provided according to the invention at least corresponding to the melting temperature whilst the longitudinal and transverse stretching is carried out.

As a result of the only slightly increased installation expenditure, the apparatus according to the invention is suitable both for producing new apparatus for producing film webs and also for retrofitting already existing apparatus operating according to the flat film method.

As a result of the longitudinal and transverse stretching of the film web still present in the molten state provided according to the invention, properties of the film, e.g. transparency, flatness and strength are increased so that a film web produced in such a manner by the flat film extrusion method can be used as a replacement for film webs hitherto fabricated by the blown film method and thus, the production flexibility of installations operating by the flat film method is further increased without excessively increasing the investment requirement.

Figure 5:
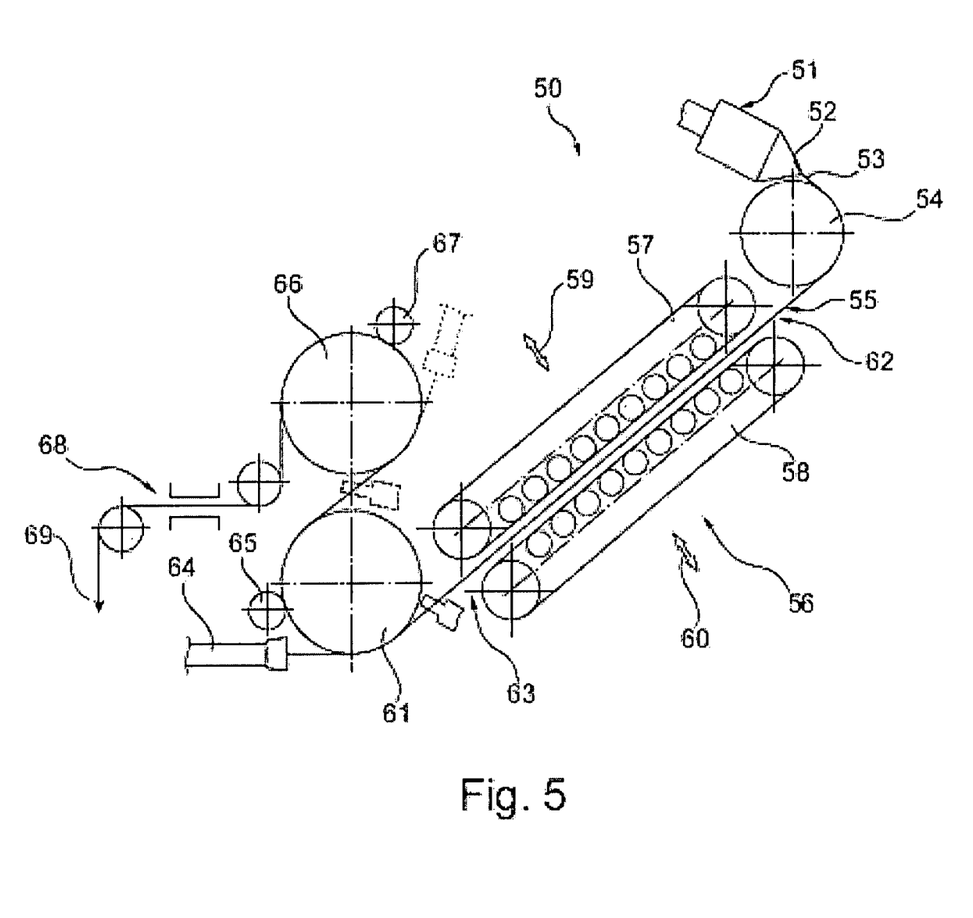
FIG. 5 shows schematically in a side view an alternative embodiment of a flat film system.

The flat film system 50 in FIG. 5 substantially consists of an extruder (not shown) which is followed in an extrusion direction by an extrusion nozzle 51 having a wide-slit nozzle 52. From this emerges during operation a film web 53, for example, made of a polypropylene melt. Typical values for the temperature of the film web 53 in the case of polypropylene are 210° C. to 290° C.

Immediately after the wide-slit nozzle 52, the film web 53 runs onto a cooling roller 54. The cooling roller 54 can, for example, be tempered to a maximum of about 200° C. Heat transfer oil, for example, is provided as thermal fluid which can be pumped through a flow and a return (both not shown) between a heating device and the cooling roller 54 in the circuit.

During operation the film web 53 runs onto the cooler cooling roller 54 and is thereby gently prefixed in its properties, but remains in melt form. Exemplary tests by the inventor have shown that the film web 53 made of polypropylene at an outlet 55 from the cooling roller 54 can, for example, have a temperature between 140° C. and 180° C.

The outlet 55 of the cooling roller 54 is followed by a transverse stretching station 56 in the form of two transverse stretching caterpillars 57, 58 which can be set onto the film web 53 by means of a pneumatic mechanism (not shown). The pneumatic mechanism can move the two transverse stretching caterpillars 57, 58 along movement directions 59, 60.

The transverse stretching station 56 can optionally be driven at a higher conveying speed that the cooling roller. It can then effect a longitudinal stretching in addition to the transverse stretching in which the film web 53 is drawn longitudinally still in the molten state.

At the same time gripping elements of the transverse stretching caterpillars 57, 58 are located at the edges of the film web 53 in relation to the extrusion direction in a diverging arrangements so that the transverse stretching station 56 provides a smaller width for the film at an inlet 62 compared with an outlet 63. This brings about a transverse drawing of the film web 53 in melt form.

After the outlet 63 from the transverse stretching station 56, the film web 53 runs around the cooling roller 61 which for example is cooled to a temperature close to the room temperature of the installation assembly, for example to a range between 15° C. and 40° C. The film web 53 runs around the cooling roller 61 at a large wrapping angle, where at the same time a suction system 64 provides for a good contact between the film web 53 and the surface of the cooling roller 61 in order to assist heat transfer from the film web 53 to the interior of the cooling roller 61. In addition, a pressing roller 65 is provided.

Another cooling roller 66 follows and likewise has the film web 53 then running around it. This can, for example be set approximately to room temperature, preferably slightly warmer than the first cooling roller 61, for example, in a temperature range of about 25° C. to 60° C.

In the exemplary embodiment shown here a cleaning roller 67 is provided at the other cooling roller 66.

After running through the further cooling roller 66, where the first cooling roller 61 and the further cooling roller 66 overall form a final cooling station for the film web 53, the film web 53 is no longer in melt form, but solidified. The film temperature has fallen below the recrystallisation temperature at least with regard to its outer layers but preferably in all the layers.

In a thickness measuring station 68, the resulting thickness of the running-out film web 69 is determined and recorded.

The invention claimed is:

1. A method for producing a film web made of thermoplastic material in which the plastic is extruded in a layer from a wide-slit nozzle in an extrusion direction and subsequently led away over a roller, wherein tensile forces in the extrusion direction and transversely to the extrusion direction are exerted on the film web in order to stretch the film web longitudinally and transversely and wherein the layer can alternately acquire a film form or a melt form, where the film form is established during a cooling of the layer below a melting range or wherein the melt form is established during a heating of the layer above a melting range,
  wherein the film web
  a. is initially extruded in melt form at an extrusion speed at or directly after leaving the wide-slit nozzle and
  b. is then guided directly afterwards in melt form to a cooling roller arrangement, wherein the film web is guided around a cooling or smoothing roller at a circumferential speed so that the film web is subjected to a longitudinal stretching,
  c. is subsequently guided out from the cooling roller arrangement and
  d. is then subjected to a transverse stretching,
  wherein both the longitudinal and the transverse stretching steps are carried out on the layer in the melt form so that the stretching takes place on both occasions in the form of a drawing of the melt.

2. The method according to claim 1, wherein the film web is cooled on the cooling or smoothing roller until reaching the film form and is released from the cooling or smoothing roller in this state.

3. The method according to claim 1, wherein the layer of the film web during the longitudinal and the transverse stretching has a higher temperature than its crystallite melting temperature.

4. The method according to claim 1, wherein the layer of the film web during the longitudinal and the transverse stretching has a higher temperature than its recrystallization temperature.

5. The method according to claim 1, wherein a releasing apparatus is used.

6. The method according to claim 1, wherein the film web is guided through a heating station between the cooling roller arrangement and the transverse stretching.

7. The method according to claim 1, wherein the temperature of the film web is regulated during the transverse stretching.

8. The method according to claim 1, wherein the temperature of the film web is not regulated during the transverse stretching.

9. The method according to claim 1, wherein the film web is subjected to transverse stretching between two rotating and adjustable disks.

10. The method according to claim 1, wherein the film web is subjected to transverse stretching by means of two diverging bands.

11. The method according to claim 1, wherein the layer of the film web has a melt form after the transverse stretching.

12. The method according to claim 1, wherein after the transverse stretching the film web is guided through a cooling station until the layer of the film web has a film form.

13. The method according to claim 1, wherein the film web in the film form is subjected to a longitudinal drawing out and/or tempering between the cooling roller arrangement and the transverse stretching.

14. An apparatus for producing a film web from thermoplastic material, the apparatus comprising an extruder communicating with a wide-slit nozzle, a cooling roller arrangement directly after the wide-slit nozzle, and a transverse stretching station located on the same apparatus in the subsequent flow path, wherein via said extruder the film web emerging from the wide-slit nozzle can be removed as a melt having a layer, and wherein the apparatus is adapted to supply the film web at a temperature above a melting range of the layer to the cooling roller arrangement and to the transverse stretching station.

15. The apparatus according to claim 14, wherein the transverse stretching station comprises two disks which are spaced apart from one another and assigned to the edges of the film web, over which the film web can be guided between a run-in and a run-out region whilst partially looping around the circumference of the same, wherein the disks are arranged so that they can be rotated about an angle from the vertical via an adjusting device in the region of the imaginary connecting line between the run-out position and the run-in position.

16. The apparatus according to claim 14, wherein this has a web guidance geometry for a first and for a second web path, in order to select between two operating modes, namely on the one hand the first web path incorporating the transverse stretching station, on the other hand, the second web path bypassing the transverse stretching station.

* * * * *